United States Patent
Shriram et al.

(10) Patent No.: US 10,905,957 B2
(45) Date of Patent: Feb. 2, 2021

(54) NETWORKING IN MOBILE AUGMENTED REALITY ENVIRONMENTS

(71) Applicant: Krikey, Inc., Menlo Park, CA (US)

(72) Inventors: Ketaki Lalitha Uthra Shriram, San Francisco, CA (US); Jhanvi Samyukta Lakshmi Shriram, San Francisco, CA (US); Jacob Gundersen, Draper, UT (US); Marc Call, Bluffdale, UT (US); Kayla Charlene Avalos, Huntington Beach, CA (US); Jae Hyun Seong, Menlo Park, CA (US)

(73) Assignee: KRIKEY, INC., Menlo Park, CA (US)

( * ) Notice: Subject to any disclaimer, the term of this patent is extended or adjusted under 35 U.S.C. 154(b) by 0 days.

(21) Appl. No.: 16/396,485

(22) Filed: Apr. 26, 2019

(65) Prior Publication Data

US 2019/0329134 A1 Oct. 31, 2019

Related U.S. Application Data

(60) Provisional application No. 62/664,870, filed on Apr. 30, 2018.

(51) Int. Cl.
*A63F 13/537* (2014.01)
*A63F 13/35* (2014.01)

(52) U.S. Cl.
CPC ............ *A63F 13/537* (2014.09); *A63F 13/35* (2014.09); *A63F 2300/8082* (2013.01)

(58) Field of Classification Search
None
See application file for complete search history.

(56) References Cited

U.S. PATENT DOCUMENTS

| 7,722,456 | B2 | 5/2010 | Walker et al. |
| 9,269,219 | B2 | 2/2016 | Lyons et al. |
| 10,248,934 | B1 * | 4/2019 | Shen ............... G10L 15/26 |

(Continued)

FOREIGN PATENT DOCUMENTS

| WO | WO 2013/116246 A1 | 8/2013 |
| WO | WO 2014/164759 A1 | 10/2014 |

OTHER PUBLICATIONS

PCT International Search Report and Written Opinion, PCT Application No. PCT/US19/29470, dated Sep. 3, 2019, 17 pages.

(Continued)

*Primary Examiner* — Seng H Lim
(74) *Attorney, Agent, or Firm* — Fenwick & West LLP (57) ABSTRACT

An augmented reality (AR) gaming experience is provided to one or more users of a networked gaming system. The gaming infrastructure includes a custom state machine that facilitates execution of a game session by sending session states and the status of AR session objects from the game system to one or more participating client devices, allowing users to view object behavior in real-time as other users interact with the objects. The system utilizes session identifiers from the state machine and the game system to synchronize video recording between all client devices in a given game session. A composite video of the game session is further generated for each participating client device by stitching together a first captured video of the game session with a second captured video of the user's reaction to the game session.

20 Claims, 7 Drawing Sheets (56) References Cited

U.S. PATENT DOCUMENTS

| | | | |
|---|---|---|---|
| 10,532,290 B2* | 1/2020 | Miura | A63F 13/86 |
| 2013/0260896 A1* | 10/2013 | Miura | A63F 13/86 |
| | | | 463/42 |
| 2014/0133836 A1* | 5/2014 | Burns | H04N 7/15 |
| | | | 386/278 |
| 2015/0248917 A1 | 9/2015 | Chang et al. | |
| 2015/0262616 A1* | 9/2015 | Jaime | H04L 65/602 |
| | | | 386/228 |
| 2015/0288875 A1* | 10/2015 | Garcia Manchado | H04L 51/02 |
| | | | 348/207.1 |
| 2016/0337718 A1* | 11/2016 | Talbott | H04N 21/4524 |
| 2016/0360256 A1* | 12/2016 | Van Os | H04N 21/443 |
| 2017/0025152 A1* | 1/2017 | Jaime | H04N 21/4223 |
| 2017/0087476 A1* | 3/2017 | Perry | A63F 13/49 |
| 2017/0109122 A1* | 4/2017 | Schmidt | A63F 13/65 |
| 2017/0354880 A1* | 12/2017 | Miura | A63F 13/23 |
| 2018/0001198 A1* | 1/2018 | Frappiea | A63F 13/49 |
| 2018/0096519 A1* | 4/2018 | Tokubo | G06F 3/0346 |
| 2018/0103196 A1* | 4/2018 | Lee | H04N 5/247 |
| 2018/0117477 A1* | 5/2018 | Miura | H04N 21/4781 |
| 2018/0129262 A1* | 5/2018 | Veiga | G06F 3/017 |
| 2018/0350144 A1* | 12/2018 | Rathod | G06Q 20/3276 |
| 2019/0020853 A1* | 1/2019 | Segal | H04N 5/2222 |
| 2019/0130620 A1* | 5/2019 | Christiansen | G06Q 50/01 |
| 2020/0274837 A1* | 8/2020 | Hildebrand | H04N 5/23222 |

OTHER PUBLICATIONS

PCT Invitation to Pay Additional Fees and, Where Applicable, Protest Fee, PCT Application No. PCT/US19/29470, dated Jun. 19, 2019, 2 pages.

* cited by examiner

NETWORKING IN MOBILE AUGMENTED REALITY ENVIRONMENTS

CROSS REFERENCE TO RELATED APPLICATIONS

This application claims the benefit of U.S. Provisional Application No. 62/664,870, filed Apr. 30, 2018, which is incorporated by reference in its entirety.

TECHNICAL FIELD

The subject matter described generally relates to networked augmented reality (AR) environments, and in particular, to using a custom state machine to exchange session states between a game engine and one or more participating client devices and providing singular control of the client devices by a host device.

BACKGROUND

Many electronic games allow for multiple gameplay where players can play together or compete with each other within a session of the game. Some electronic games allow multiplayer gameplay to involve multiple devices, each running a copy of the game. Finite state machines may be used to organize and represent an execution flow of events and transitions occurring during gameplay. While current state machines pass session states between similar software programs, they do not allow for sophisticated communication between programs using different languages and varied frameworks by which they process session states and user data. Nor do these state machines facilitate data sharing between a 3D rendering engine and the client devices being used by game participants.

Further, while network sessions often involve multiple users, each with his or her own client device, current implementations do not synchronize video recording among the devices in a given session or allow for singular control of multiple devices by a session host.

BRIEF DESCRIPTION OF THE DRAWINGS

Figure

DETAILED DESCRIPTION

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

Overview and Example Benefits

An example networked gaming environment may include one or more client devices and a game system connected by a network. Each client device may include at least one game application running an instance of a game on the client device. The game system and the game applications on the client devices form a game mediation infrastructure to mediate game sessions. For example, the game applications receive interactions at the client devices and communicate with the game system to impact initiation and execution of the game sessions. In one embodiment, the game system executes a custom state machine that passes states of the game session between the game system and the participating client devices.

In one embodiment, a first client device launches the game application and selects a game. The game system instructs a 3D rendering engine on the first client device to render a display associated with the selected game. The 3D rendering engine may be a component of a game application running on the client device. In one embodiment, the rendering display includes a real-time or near-real-time video feed captured by a camera on the first client device and one or more augmented reality (AR) elements associated with the game.

The game system provides for display on the first client device an invitation overlay allowing a user of the first client device to invite one or more additional users to join the game session. Responsive to the user providing input declining to invite additional users, the game system launches and begins executing a single-player game session. Responsive to the user providing input to invite one or more additional users to the game session, the game system sends a deep link including a session identifier to the one or more invented client devices. Deep links link to a resource such as a game, and additionally specify a more specific context within the resource, such as a particular stage or state of the game. Responsive to the one or more invited client devices joining the game session, the game system launches and begins executing the multi-player game session.

In one embodiment, the infrastructure is used to send the session states of the networked game session and the status of AR objects from the game system to between the participating client devices. The game system acts as a mediator for communicating between a host client device and one or more invited client devices in these sessions, allowing the users to see feedback on the displayed AR objects in real-time or near-real-time.

The state machine can inform the client devices whether the game session is in progress or disconnected. In one embodiment, the game system identifies a client device of a user that initiated the game session (i.e., the host client device). Using this information, the game system can provide control to the session host for recording a video such that the participating client devices (i.e., the host device and one or more invited client devices) automatically begin recording a front-facing video feed responsive to the host providing input to initiate the game session and stop recording the video feed responsive to the host providing input to terminate the game session.

The game system generates a composite video of the game session for each participating client device by editing the game session video captured by each client device to show highlights of the game session for the corresponding client device (e.g., instances of the user scoring, preventing another using from scoring, and the like). The game system further instructs a rear-facing camera on each participating client device to record a video for a specified period of time (e.g., 2 seconds) after the forward-facing camera has stopped recording the game session (i.e., after the game session has ended) and stiches the forward and rear-facing videos together to create a composite video for the user and the game session. In this way, the user is able to view highlights from his or her performance during the game session as well as the user's reaction immediately after the game has ended and share the composite video on the game system and/or on a third-party system.

Example Networked Gaming System

Figure 1:
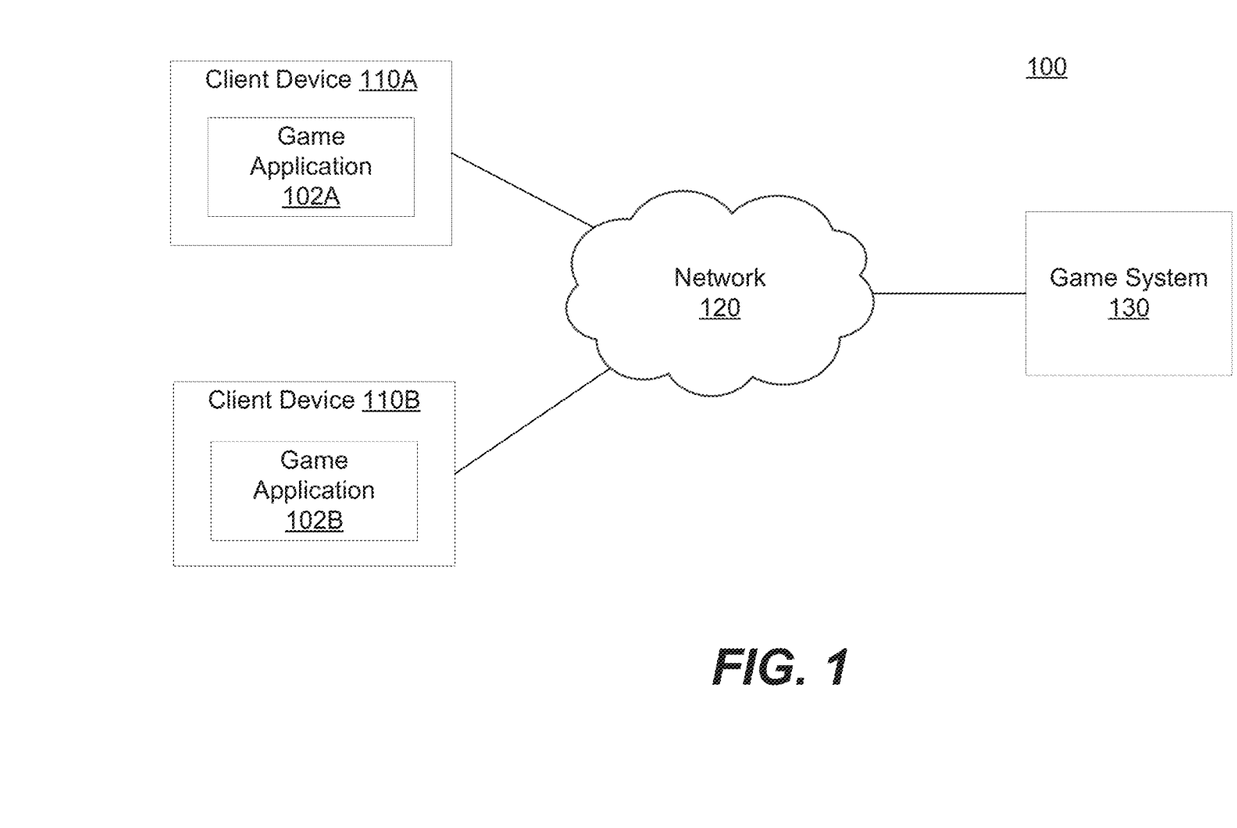
FIG. 1 is a block diagram illustrating a networked gaming system, according to one embodiment.

Turning now to Figure (FIG. 1, it illustrates a high-level block diagram of a networked gaming system 100, according to one example embodiment. FIG. 1 illustrates two client devices 110A and 110B (generally 110) and a game system 130 connected by a network 120. Only two client devices 110 are shown in FIG. 1 in order to simplify and clarify the description. Embodiments of the networked gaming system 100 can have many clients 110 connected to the network 120 and the game system 130. Likewise, the functions performed by the various entities of FIG. 1 may be distributed among the elements in a different manner than described.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110B" in the figures.

A client device 110 is an electronic device used by a user to perform functions such as communication with other clients, executing software applications for various purposes, and consuming electronic content such as content hosted by web servers on the network 120. For example, the client may be a smart phone, or a tablet or notebook computer. The client 110 includes a display on which the user may view content such as electronic games and a camera with which forward-facing and rear-facing images and videos may be captured. In addition, the client 110 includes a user interface (UI), such as physical and/or on-screen buttons, which the user may interact with to perform various functions with the client.

The client device 110 includes at least one game application 102 that mediates multiplayer gameplay. Depending upon the embodiment, the game application 102 may be integrated into the operating system, or implemented as a separate application or other software executing on the client device 110. In some embodiments, the game application 102 is distributed among a plurality of locations, for example, in part on the client device 110 as an independent software item, and in part on the game system 130. The game application 102 may include a user interface that displays a list of games available to be played by the user of the client 110A and one or more other users associated with one or more other client devices 110.

The game infrastructure used to enable game sessions includes at least the game application 102, the game system 130, and, in some embodiments, at least one other game application 102 on at least one other client device 110. Depending upon the embodiment, the game infrastructure controls various aspects of a game session, for example, launching a game session and providing composite images for display on the client devices 110. In one embodiment, a game session may be launched via a UI of the game application 102, using a "deep link" (a link, such as Uniform Resource Locator (URL), to a resource such as a game, and that additionally specifies a more specific context within the resource, such as a particular stage or state of the game). In an embodiment, the game application 102A runs on a first client device 110A and interacts with a second client device 110B, such as with a game application 102B, to enable the client device 110B to participate in the game session launched by the client device 110A. In other embodiments, more than one client device 110 may be interacted with by the client device 110A to enable participation in the game session launched by the client device 110, e.g., up to as many as the game being played supports.

The network 120 enables communications among the client devices 110 and the game system 130. The network 120 allow for use of wired and/or wireless communications technology. The network 120 may comprise the Internet and/or mobile telephone networks (e.g., LTE, 4G, 5G, etc.). In one example embodiment, the network 120 uses standard communications technologies and/or protocols. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The entities can use custom and/or dedicated data communications technologies instead of, or in addition to, the ones described above.

The game system 130 interacts with the client devices 110 to provide game sessions to users of the client devices 110. The game may be a dedicated software application built natively for the client device 110 or code (e.g., HTML 5 code) running within a game playing engine. A game session involves one or more users interacting with respective client devices 110 to play a set of instances of a game in coordination with each other. In multiplayer game sessions, multiple client devices 110 participate in a single game session, interactively playing the same game. In single player game sessions, one client device 110 participates in a single game session. In some embodiments, the game runs on the game system 130, and is accessed using the client device 110, which provides an interface to play the game. For example, the game executes upon the game system 130, which sends the results of the execution of the game to the client devices 110. The client devices 110 interact with the results of the execution that are received from the game server 130 and send the interactions to the game server 130, which impact the execution of the game. The game session may progress in this back and forth manner.

Example Game System

Figure 2:
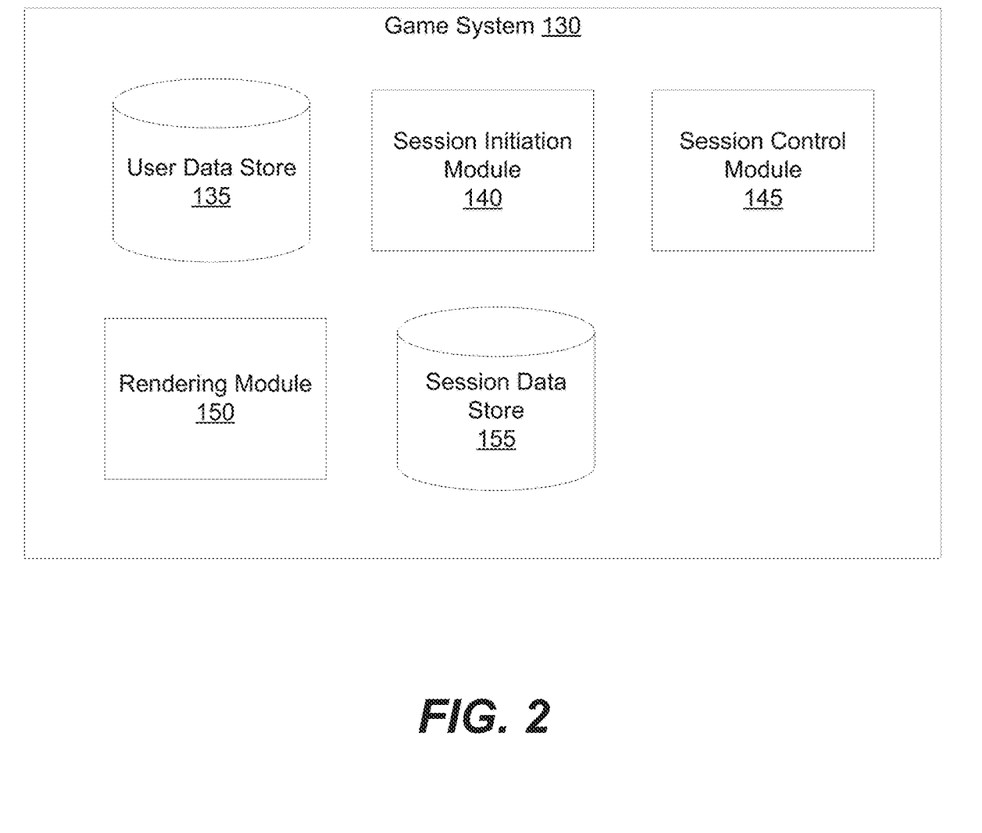
FIG. 2 is a block diagram illustrating the game system of FIG. 1, according to one embodiment.

FIG. 2 illustrates a block diagram of an architecture of the game system 130, according to one example embodiment.

The game system 130 shown in FIG. 2 includes a user data store 135, a session initiation module 140, a session control module 145, a rendering module 150, and a session data store 155. In other embodiments, the game system 130 may include additional, fewer, or different components for various applications. Conventional components such as network interfaces, security functions, load balancers, failover servers, management and network operations consoles, and the like are not shown so as not to obscure the details of the system architecture.

Each user of the game system 130 is associated with a user profile (or user account), which is stored in the user data store 150. A user profile includes declarative information about the user that was explicitly shared by the user and may also include profile information inferred by the game system 130. In one embodiment, a user profile includes multiple data fields, each describing one or more attributes of the corresponding user of the game system 130. Examples of information stored in a user profile include a user name, biographic data, contact information, privacy settings, a list of users to whom the user is connected on the game system 130, and the like. A user profile in the user data store 150 may also maintain references to actions by the corresponding user performed on the game system 130 and stored in the session data store 155.

The session initiation module 140 initiates game-playing sessions between one or more client devices 110. A user of the client device 110A may select a game from a list of available games displayed through the game application 102. Upon selection of a game by the client device 110A, the session initiation module 140 determines that a state change has occurred and sends the state change to a three-dimensional (3D) rendering engine of the game application 102 on the client device 110A. In one embodiment, the 3D rendering engine of the client device 110A instructs a camera on the client device 110A to initiate a front-facing video and renders a display of the game application 102A associated with the selected game. The session initiation module 140 further generates a session identifier for the game session and sends the session identifier to the client device 110A.

Responsive to the user of the client device 110A (also referred to herein as the "host" for this example) providing input to initiate the game session, the session initiation module 140 queries the host through the game application 102A to determine whether to initiate a single player game session or a multiplayer game session. The session initiation module 140 may also identify users connected to the host, e.g., friends of the host, and suggest to the host that the host invite the identified users to a game. Alternatively, the session initiation module 140 may identify other users to whom the host is not connected (e.g., has never played with) and may recommend to the host that the host play with the identified users. Upon selection by the host of one or more client devices 110 for invitation to the game session, the session initiation module 140 determines that a state change has occurred and sends the state change to a 3D rendering engine of each game application 102 of each invited client device 110. The session initiation module 140 further generates an invitation message and sends the invitation message to each selected client device 110 through the game application 102 or through a text message on the client device 110. In one embodiment, the invitation message includes the session identifier for the game session.

Upon receipt of an invitation message, the game application 102 of each invited client device 110 prompts a user of the invited client device 110 to either accept or reject the invitation. If a user of an invited client device 110B provides input to the game application 102B accepting the invitation, the session initiation module 140 may further interact with the client device 110B to enable participation in the game session. Specifically, the session initiation module 140 receives the user input and determines that a state change has occurred sends the updated state to the 3D rendering engine on the invited client device 110B. Responsive to receiving the state change notification, the 3D rendering engine on the invited client device 110B instructs a camera on the invited client device 110B to initiate a front-facing video feed and renders a display of the game application 102B associated with the state change. For example, in one embodiment, the updated display includes a video feed overlaid by one or more augmented reality (AR) elements, as discussed below.

Alternatively, if the user of the invited client device 110B provides input declining the invitation to join the game session, the session initiation module 140 sends the state change to the 3D rendering engine on the invited client device 110B and the host client device 110A. In one embodiment, the 3D rendering engines on both the invited client device 110B and the host client device 110A cause the game session to be terminated. In other embodiments, the session on the host client device 110A remains active such that the host can participate in a single player game session or invite one or more other users to participate in a multiplayer game session.

In one embodiment, one or more additional users may join a single player or multi player game session that is already in progress by inputting the session identifier associated with the game session through the game application 102. Responsive to receiving the session identifier from the client device 110B, the session initiation module 140 sends a state change notification to the 3D rendering engines on the host client device 110A and the additional client device 110B, which render updated displays associated with the state change. For example, an updated display on the host client device 110A might include AR text and/or graphical elements notifying the host that an additional user has joined the game session.

The session initiation module 140 proceeds to launch the game after receiving notifications that one or more invited client devices 110 have accepted the invitation, or, in some embodiments, that the host client device 110A has declined to invite additional client devices 110. In one embodiment, the game is hosted on the game system 130, and the session initiation module 140 sends the participating client device(s) parameters associated with the game session, such as identifiers of the participating client device(s).

The session control module 145 controls the single or multiplayer game session by receiving user input through the game application(s) 102 on the participating client device(s) 110 and determining subsequent state changes associated with the game session. For example, if a user participating in the game session performs an action within the game, the action is communicated to the session control module 145, which determines an effect of the action and applies the effect to the game session, populating that action and its effects to any other client devices 110 that are participating in the game session. In one embodiment, responsive to determining an effect of a user action, the session control module 145 instructs the rendering module 150 to generate for display one or more AR elements associated with the effect and to send the generated AR element(s) to the 3D rendering engine on the participating client devices 110.

In one embodiment, recording functionality during the game session is based on input received from the host client device 110A. The session control module 140 determines a client identifier of the host client device 110A that initiated the game session. Responsive to the user of the host client device 110A providing input through the game application 102A to begin recording the game session, the session control module 140 instructs the other participating client devices 110 to enable automatic recording and to disable separate recording functionality during the game session. If the host provides input to the host client device 110A to terminate the game session, the session control module 140 sends the state change to the participating client devices 110 and instructs the participating client devices 110 to stop recording.

The session control module 145 receives user input through the game applications 102 during the game session and uses rules to determine effects associated with the received input. For example, assume that two users are playing a basketball game for which the object is to get as many balls through the hoop as possible during a specified time period. If a first user provides input through the game application 102A (e.g., by tapping at a point on the display of the client device 110A), the session control module 145 determines an effect associated with the user input. For example, the session control module 145 might determine that the user has tapped the correct portion of the display to allow a basketball to go through the hoop and update the score of the game to award a point to the first user. Responsive to determining the effect of the user input, the session control module 145 instructs the rendering module 150 to render one or more AR elements associated with the effect, such as dynamic AR elements showing a basketball going through the hoop and showing an AR scoreboard being updated. In this way, states of the game session and the status of the AR objects are updated and sent to the participating client devices 110 in real-time.

The session control module 145 continues to monitor state changes of the game session until the game session is terminated by one or more of the participating client devices 110. In one embodiment, the game session may only be terminated by the host client device 110A, while in other embodiments, the game session may be terminated by the host client device 110A or by another participating device 110.

Responsive to determining that a user has provided input through the game application 102 to terminate a game session, the session control module 145 notifies the 3D rendering engines on the participating client devices 110 of the state change and instructs the 3D rendering engines to terminate the game session and, in some embodiments, end the video feed. In one embodiment, the session control module 145 instructs the rendering module 150 to generate for display one or more AR elements associated with the session termination. For example, the AR elements may include graphical and/or textual elements that inform the user that the user won or lost the game. The rendering module 150 sends the generated AR elements to the 3D rendering engines on the client devices 110 and instructs the 3D rendering engines to overlay the AR elements on the video feed. Still further, in some embodiments, responsive to receiving an instruction to terminate the game session, the session control module 145 instructs the rendering module 150 to generate a composite video associated with the game session and to provide the generated video for display on the participating client devices 110.

The rendering module 150 generates AR elements associated with the game session based on state change notifications received from the session control module 145 and provides the AR elements to the 3D rendering engines on the client devices 110 for display. In one embodiment, the rendering module 150 instructs the 3D rendering engines to display the generated elements as a 3D graphical overlay on a video feed or image captured by the camera on the client device 110.

In one embodiment, the rendering module 150 generates the same AR elements for display on multiple client devices 110. For example, if two users are playing a basketball game and one user scores, the session control module 145 might instruct the rendering module 150 to generate for display on both client devices 110 an animated graphical element showing a scoreboard being updated. Alternatively, the rendering module 150 generates for display different AR elements for the various devices participating in the game session. For example, the session control module 145 might instruct the rendering module 150 to generate AR text reading "You scored!" on the scoring user's client device 110 and "Melissa scored!" on the client devices 110 of the other participating users in the game session.

The rendering module 150 further generates for display a composite video for each user client device 110 participating in the game session. For example, in response to the host client device 110A providing input to terminate the game session, the session control module 145 instructs the camera on the client device 110 to stop recording and to send the recorded video to the game system 150. The rendering module 150 searches the received video for one or more markers or notable events occurring within the video (e.g., a user scoring) and selects one or more events having a cumulative duration less than or equal to a specified period of time (e.g., 5 seconds). In some embodiments, while the rendering module 150 is editing the game session video, the session control module 145 instructs the client device 110 to trigger a rear-facing camera to enable the camera to capture the user's reaction to the game session. The front-facing camera may be activated for a specified period of time (e.g., 2 seconds). Alternatively, the front-facing camera remains active until the user provides input through the game application 102 to stop recording. The rendering module 150 receives the captured reaction video and stiches the reaction video to the edited game session video to create a composite video of the game session that includes a front-facing video of game highlights and a rear-facing video showing the user's reaction to the game session. The rendering module 150 provides the composite video for display on the client device 110, and the user may provide input to approve or disapprove of the video and to share the video on the game application 102 and/or on third-party systems, such as a social networking system.

The session data store 155 stores data associated with each game session, such as identifiers of the one or more participating client devices 110, an identifier of the game session, the length of the game session, and the result of the game session, such as an identifier of the winning client device 110 and a score of the game session. In one embodiment, the stored data includes a recording of the game session as captured by the host client device 110. As discussed above, the recording of the game session may be used by the rendering module 150 to generate a video comprising one or more highlights of the game session.

Example Method

Figure 3:
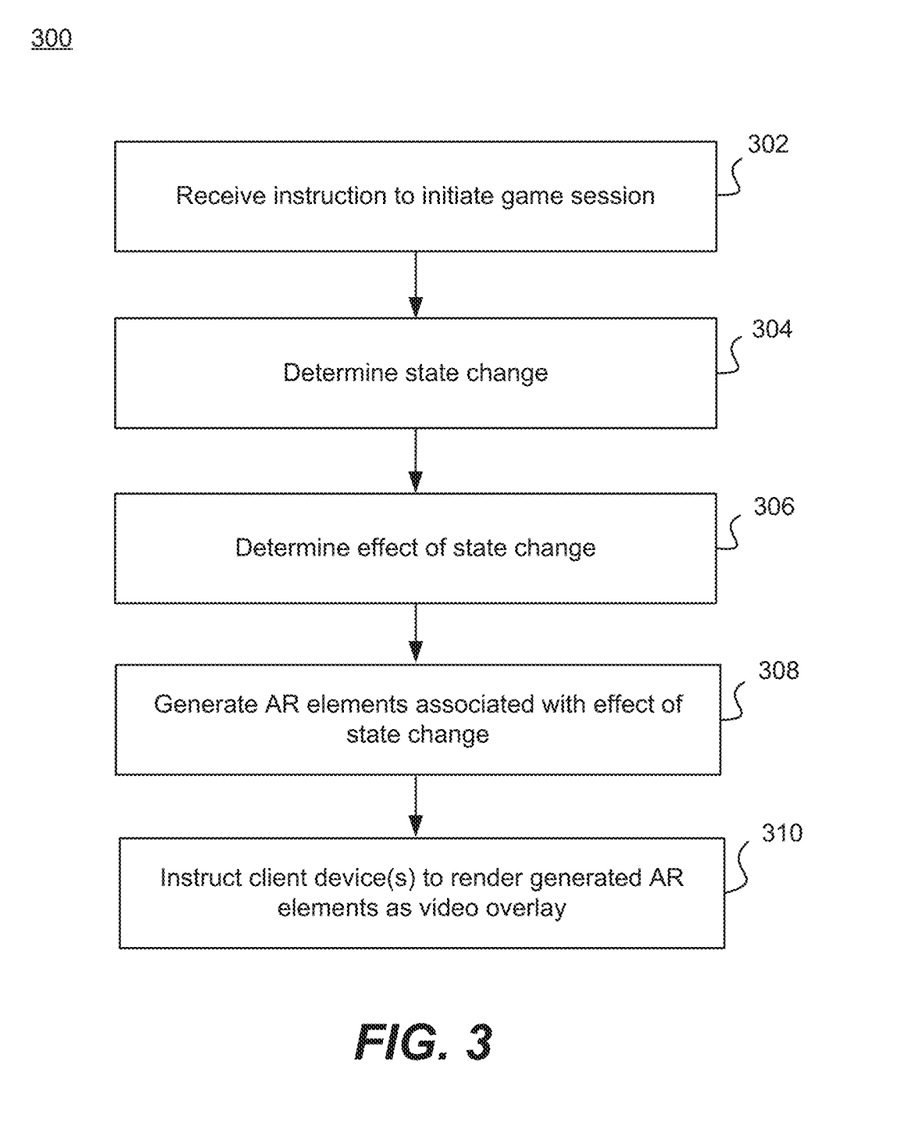
FIG. 3 is an example state machine for rendering a composite video associated with a game session, according to one embodiment.

FIG. 3 illustrates a method 300 for managing a networked game session, according to one embodiment. The steps of FIG. 3 are illustrated from the perspective of the game system 130 executing the state machine that performs the method 300. However, some or all of the steps may be performed by other entities or components. In addition, some embodiments may perform the steps in parallel, perform the steps in different orders, or perform different steps. In addition, the steps may be embodied as instructions executable by a processor of a machine, for example, as described by FIG. 7.

At 302, a user of a host client device 110A provides input through the game application 102A to initiate a game session through the networked gaming system 100. In one embodiment, upon selection of a game by the host client device 110A, the session initiation module 140 instructs the rendering module 150 to generate one or more AR elements associated with the selected game and to provide the generated elements for display on the host client device 110A. The display may include graphical and/or textual elements of the game, such as a logo, a color scheme, and one or more interactive elements that may be used to play the game and/or invite one or more additional users to join the game session. For example, in one embodiment, the rendering module 150 provides for display an interactive graphical overlay listing names of other users whom the host can invite to the game session and/or a link to an invitation page through which the host can input identifiers of one or more additional users.

Throughout the game session, the session control module 145 determines 304 state changes based on input from the host client device 110A and one or more participating client devices 110B and determines 306 an effect of the state change based on rules associated with the game. For example, in one embodiment, the host client device 110A selects a client device 110B to invite to the game session. The session control module 145 sends (or transmits) the state change to the 3D rendering engine of the game application 102B with instructions to render an invitation on the display of the client device 110B inviting the user of the client device 110B to join the game session.

The session control module 145 takes one or more actions based on the determined effect. For example, if the user of the client device 110B declines the invitation to join the game session, the session control module 145 sends the state change to the 3D rendering engines on the client devices 110A and 110B and terminates the game session. Conversely, if the user of the client device 110B accepts the game session invitation, the session control module 145 sends the state change to the 3D rendering engines on the client devices 110A and 110B and starts the game session.

In some embodiments, the rendering module 150 generates 308 one or more AR element(s) associated with the state change and instructs 310 the client devices 110A and 110B to render the AR elements(s) as an overlay on real-time or near-real-time video feed captured by cameras on the client devices 110A and 110B. For example, if the session control module 145 determines that the user of the client device 110B has scored, the rendering module 150 might generate dynamic AR elements showing a game scoreboard being updated (e.g., for display on both of the client devices 110A and 110B) and/or text associated with the state change (e.g., text stating "You Scored!" or "Nice!" for display on the client device 110B and/or "Abby scored!" or "You Can Do It!" for display on the client device 110A). As another example, if host client device 110A terminates the game session, the rendering module 150 might render for display on the client device 110B AR text informing the user of the client device 110B that the host ended the game session.

Example State Machine

Figure 4:
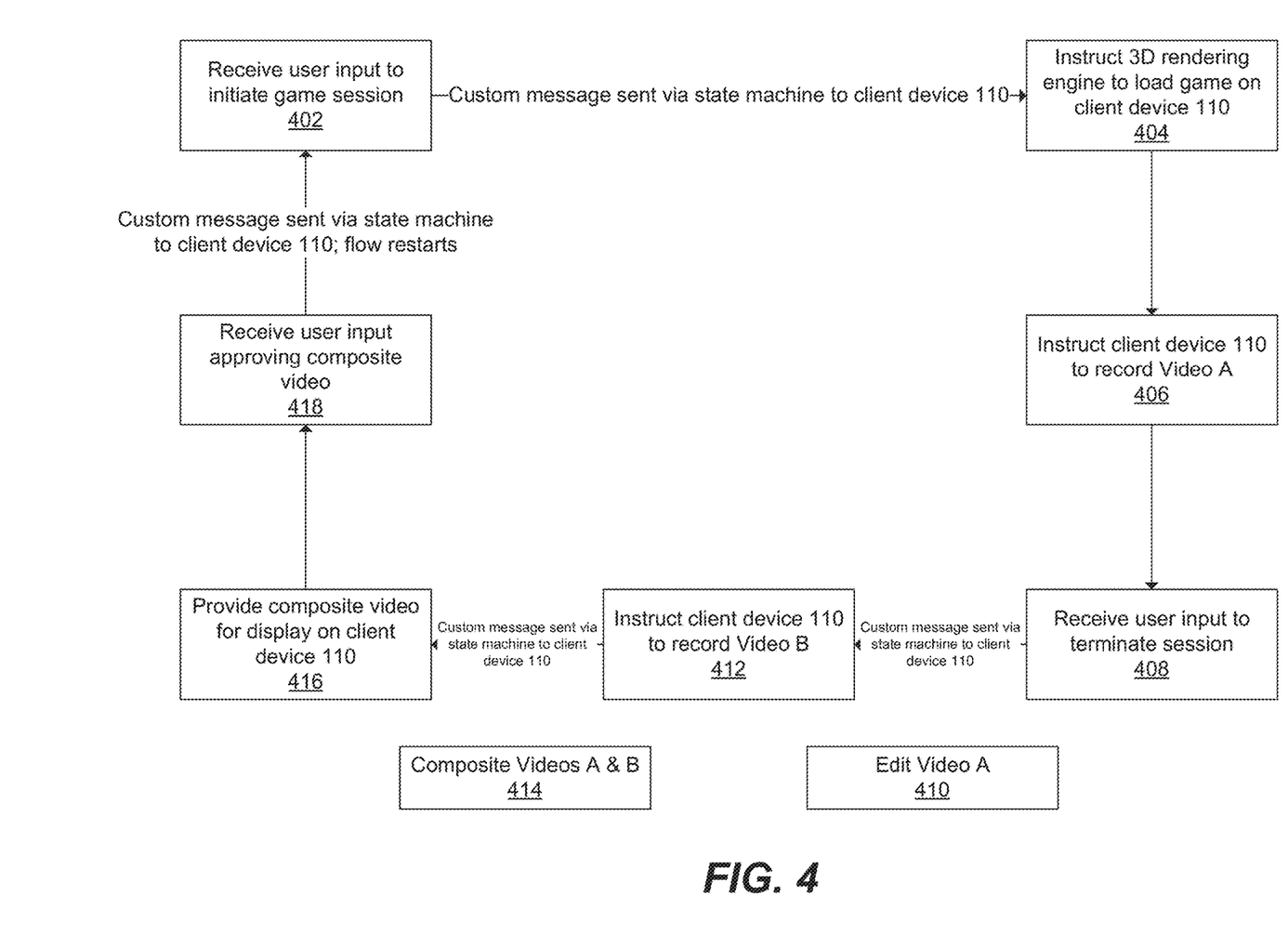
FIG. 4 a flow chart illustrating a method for managing a networked game session, according to one embodiment.

FIG. 4 illustrates an example custom state machine executed by the game system 130 for rendering a composite video associated with a game session, according to one embodiment. The state machine passes information between the game system 130 and the client devices 110 regarding the state of the game session and the status of the game objects such that the users of the client devices 110 can see object behavior in real-time as other users interact with session objects.

The steps of FIG. 4 are illustrated from the perspective of the game system 130 executing the state machine that performs the method 400. However, some or all of the steps may be performed by other entities or components. In addition, some embodiments may perform the steps in parallel, perform the steps in different orders, or perform different steps.

The session initiation module 140 of the game system 130 receives user input through the client device 110 to launch the game application 102 to begin a single-player or multi-player game session. In one embodiment, responsive to the client device 110 launching the game application 102, the session initiation module 140 instructs the client device 110 to start a video feed using a forward-facing camera of the client device 110. The video feed may be augmented by one or more AR elements including a list of available games.

At 402, the user of the client device 110 provides input selecting a game from the list of available games. Responsive to receiving the user input, the session initiation module 140 sends a message via the state machine to the client device 110 instructing 404 the 3D rendering engine on the client device 110 to load the selected game. In one embodiment, the 3D rendering engine renders one or more AR elements generated by the rendering module 150 and associated with the game application 102 and/or the selected game. For example, the user of the client device 110 may invite other client devices 110 to the game session from within the game session, for example, using on-screen buttons overlaying the video feed, as described below with respect to FIG. 5.

Responsive to initiating the game session on the client device 110, the session initiation module 140 instructs 406 the client device 110 to begin recording the game session ("Video A"). In one embodiment, the forward-facing camera records the game session inside the game application 102 without the presence of native user interface elements of the client device 110. The game system 150 and the client device 110 continue to interact to execute the game session. In one embodiment, the game runs on the game system 150, and is accessed using the client device 110, which provides an interface to play the game. For example, the game is executed upon the game system 150, which sends the results of the execution to the client device 110. The client device 110 interacts with the results of the execution that are received from the game system 150 and sends the interactions to the game system 150, impacting execution of the game.

The game session progresses in this back-and-forth manner until the session control module 145 receives 408 user input to terminate the game session, for example, if the client device 110 quits the game application 102 or if the user chooses not to start a new game after a first game is complete. Responsive to receiving the input to terminate the game session, the session control module 145 instructs the client device 110 to stop recording the game session and instructs the rendering module 150 to edit the recorded video.

The rendering module 150 edits 410 Video A by selecting events occurring during the game session and recorded by the forward-facing camera on the client device 110. In one embodiment, the rendering module 150 edits down Video A to a specified number of seconds (e.g., 5 seconds) by using a custom algorithm that searches the video feed for one or more markers or notable events associated with the game session (e.g., the user scoring, the user preventing another user from scoring, a prolonged play, a final score of the game, etc.). Responsive to identifying a plurality of markers in Video A, the rendering module 150 selects (e.g., randomly) at least one marker for inclusion in the edited video. In one embodiment, the selected markers have a cumulative duration equal to or less than a threshold amount of time. For example, if the threshold amount of time is five seconds, the rendering module 150 might select a first marker lasting approximately 1 second (e.g., a user scoring a first time), a second marker lasting approximately 2 seconds (e.g., a user preventing another user from scoring), and a third marker lasting approximately 1 second (e.g., a final score of the game), such that the cumulative duration is equal to the threshold amount of time. After selecting the markers for inclusion in the edited video feed, the rendering module 150 filters Video A to include footage associated with the selected markers and filters out remaining video footage from Video A. Alternatively, the edited video includes a specified number of game events (e.g., the user scoring or winning the game) such that the duration of the edited video is based in part on the duration of each selected event. In one embodiment, events are selected based on specified parameters to generate the most interesting video. The rendering module 150 may weight events based on their elements of visual interest. For example, an event for the moment a user wins the game is weighted higher than the moment the game started. In this way, the rendering module 150 generates, for each user, a customized video that includes highlights of the game session.

In one embodiment, while the rendering module 150 is editing Video A, the session control module 145 sends an instruction 412 via the state machine to the client device 110 to instruct the client device 110 to trigger a rear-facing camera and to record a video ("Video B") using the rear-facing camera. For example, Video B may capture the user's reaction to the game session during a period of time (e.g., two seconds) after the game session ends. In this way, Video B may be a "selfie" video of the user reacting to having won or lost the game. In one embodiment, the session control module 145 instructs the rear-facing camera to capture a video feed for a specified period of time, while in other embodiments, the rear-facing camera remains activated until the user provides input through the game application 102 to end the recording.

At 414, the rendering module 150 generates a custom video for the user of the client device 110 based on the recorded videos. In one embodiment, the rendering module 150 stitches together the edited Video A, captured by the forward-facing camera on the client device 110, with Video B, captured by the rear-facing camera on the client device 110. A custom video slicer API speeds up Video B (the user's reaction video), and stitches it together with the edited Video A (the selected game highlights). In some embodiments, the rendering module 150 generates one or more static or dynamic AR elements for inclusion in the composite video. For example, the composite video might include AR text reading "Good Game!" or "Start New Game?" and/or graphical elements such as a trophy or exploding fireworks to celebrate a user's win. The rendering module 150 provides 416 the composite video to the 3D rendering module for display on the client device 110.

The user may provide input in response to playback of the composite video. The rendering module 150 receives 418 the user input and takes one or more actions based on the user input. For example, in one embodiment, the user may approve the video and/or provide an instruction to share the video inside of the game application 102 such that the video is viewable by the user and/or one or more other users of the game system 150. Additionally or alternatively, the user may provide an instruction to share the composite video outside the game application 102, e.g., on a third-party website or system, such as a social networking system. The composite video may further be stored in association with the user in the user data store 135.

In some embodiments, the flow executed by the custom state machine may be repeated for one or more subsequent game sessions. For example, after the user approves the composite video, the user may provide input to start a new game session (e.g., by selecting a new game). Further, while the described embodiment generated a composite video capturing a single-player game session, the game system 130 may perform a similar method for game sessions that include one or more other participating client devices 110.

Example Session Initiation Display

Figure 5:
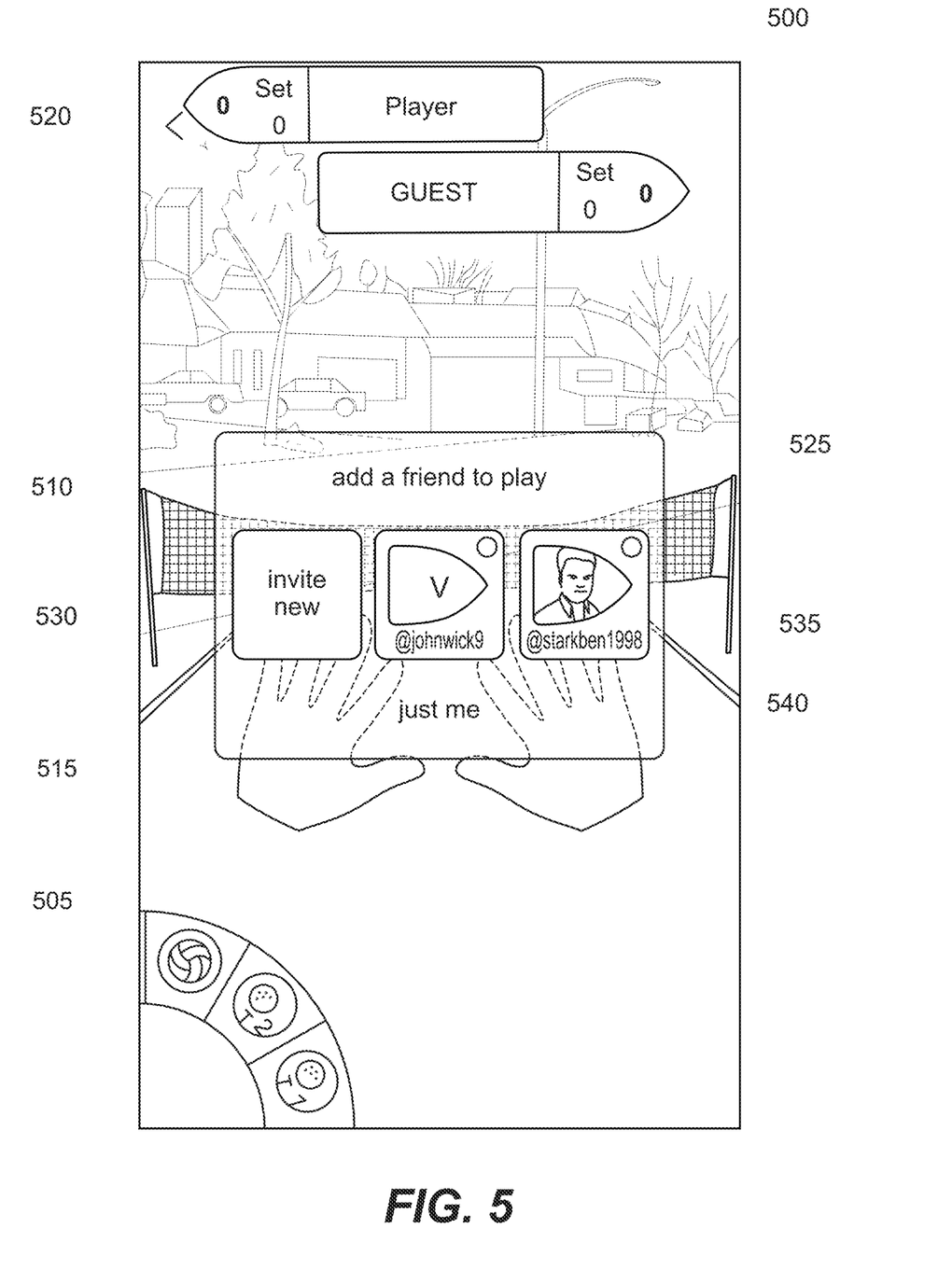
FIG. 5 is an augmented reality image illustrating initialization of a networked game session, according to one embodiment.

FIG. 5 is an AR image 500 illustrating initialization of a networked game session, according to one embodiment. The AR image 500 may a be a dynamic visual interface (e.g., an interactive user interface) that can be dynamic and presented on a screen of a computing device, for example, of a type described in FIG. 7. In the embodiment shown in FIG. 5, a user of a host client device 110A has opened the game application 102A to initiate a game session. Responsive to the user opening the game application 102A, the session initiation module 140 instructs a camera on the host client device 110A to initiate a live video feed, and the rendering module 150 generates for display one or more AR elements associated with initialization of the game session. For example, as shown in FIG. 5, the AR elements include a gaming wheel 505 through which the user may select a game. The user may change the display of available games by providing input on the display to spin the wheel upward or downward and may select an available game by tapping on an icon in the gaming wheel 505. For example, in the embodiment shown in FIG. 5, the user has selected an icon associated with a volleyball game. Responsive to receiving the user selection, the session initiation module 140 instructs the rendering module 150 to generate dynamic AR elements associated with the volleyball game, such as a net 510, a pair of hands 515, and a scoreboard 520. The rendering module 150 provides the generated elements to the 3D rendering engine on the host client device 110, which overlays the AR elements on the video feed.

The AR elements shown in FIG. 5 further include an invitation overlay 525 allowing the user of the host client device 110 to invite one or more additional users to join the game session. In one embodiment, the invitation overlay 525 includes an invitation button 530, the selection of which allows the host to invite one or more additional users to join the game session. For example, upon selection of the invitation button 530, the session initiation module 140 instructs the application 102A to load an invitation page enabling the host to send invitations to join the session to other client devices 10. In one embodiment, the invitation page includes a list of invitation techniques, such as a notification from the gaming application 102B or through a native messaging application (e.g., iMessage™) on the client device 110B. The invitation page also may include a list of client devices 110 to whom an invitation may be sent, each listed client device 110 including, for example, a name. Additionally or alternatively, the invitation page may include a field in which the host may input an identifier of a client device 110B, such as a phone number.

Upon selection of one or more client devices 110 for invitation and selection of one or more invitation techniques, the host client device 110A generates an invitation message and configures the selected invitation techniques such that the invitation message may be sent. For example, if the invitation technique is a text message and the invitee is a client device 110B, the client device 110A generates a textual invitation message, opens a text message application on the client device 110A, addresses the text to the invitee, and pastes the invitation message into a message portion of the text message application. The host may then cause the invitation to be sent to the invitee using a button of the text message application. The invitation overlay 525 further includes identifiers 535 of one or more additional users of the game system 130 to whom the host can invite to join the game session and a single player selection button 540 that the user can select to initiate a single player game session.

Example Game Session Display

Figure 6:
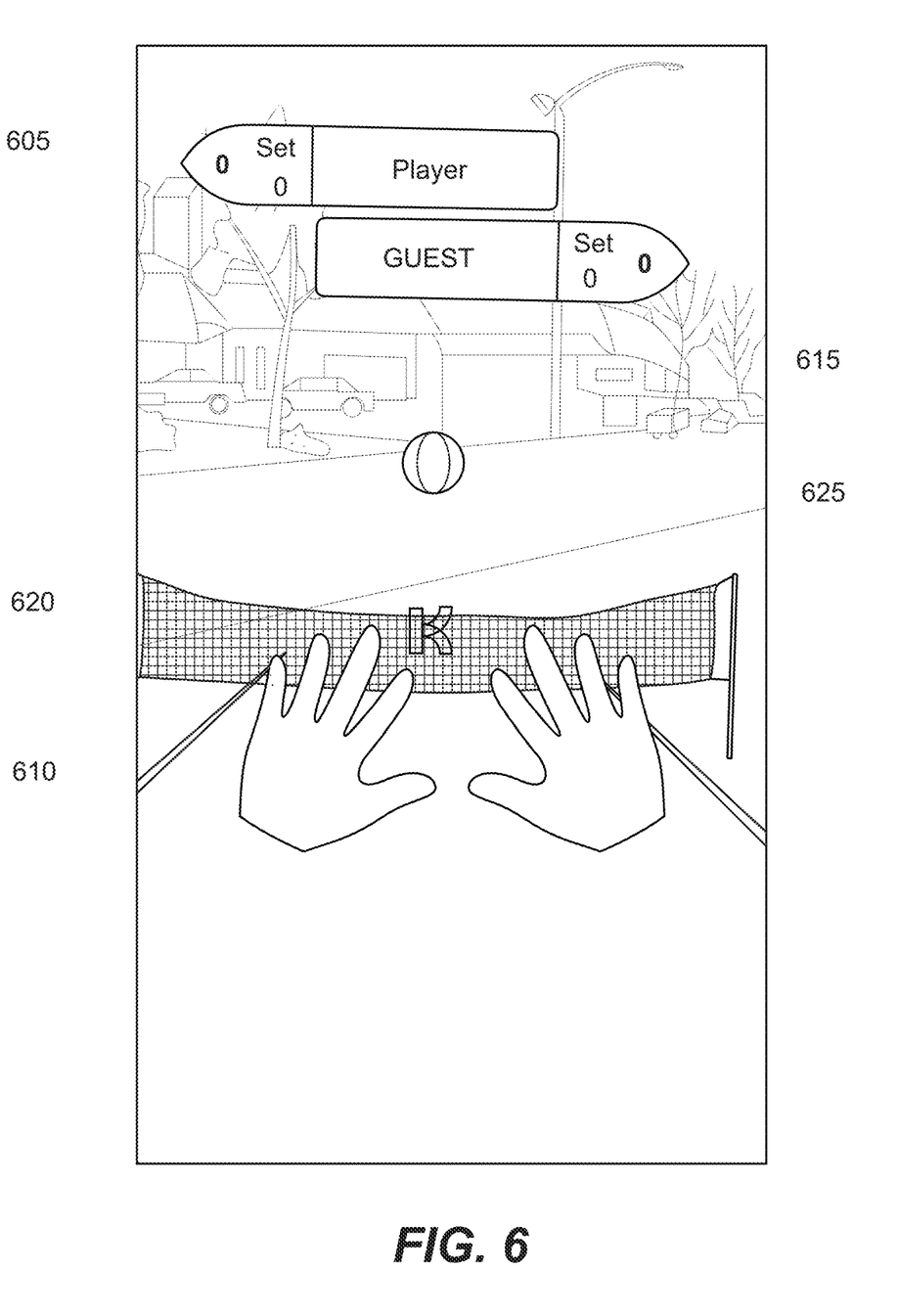
FIG. 6 illustrates an augmented reality image illustrating a state of a networked game session, according to one embodiment.

FIG. 6 is an AR image 600 illustrating a state of a networked game session, according to one embodiment. The AR image 600 may a be a dynamic visual interface (e.g., an interactive user interface) that can be dynamic and presented on a screen of a computing device, for example, of a type described in FIG. 7. In the embodiment shown in FIG. 6, the user has selected the volleyball game, and the rendering module 150 provides for display dynamic AR elements associated with the selected game. For example, the AR elements include a scoreboard 605 identifying the one or more participants in the game session and a score, a pair of hands 610, a ball 615, a net 620, and a bot opponent 625 that provides an opponent for the user in a single-player session. The user of the client device 110 may provide input by selecting (e.g., tapping on) the hands 610. Responsive to receiving the user input, the rendering module 150 generates for display dynamic AR elements associated with the user input. For example, the AR elements may include the ball 615 moving on the display across the net 620 and toward the target 625. Additional AR elements may include text informing the user of a status of the game (e.g., the user scored a point or won the game) and/or instructing the user to turn or tilt the client device 110 such that the AR elements are captured in the field of view of the camera.

Computing System Architecture

Figure 7:
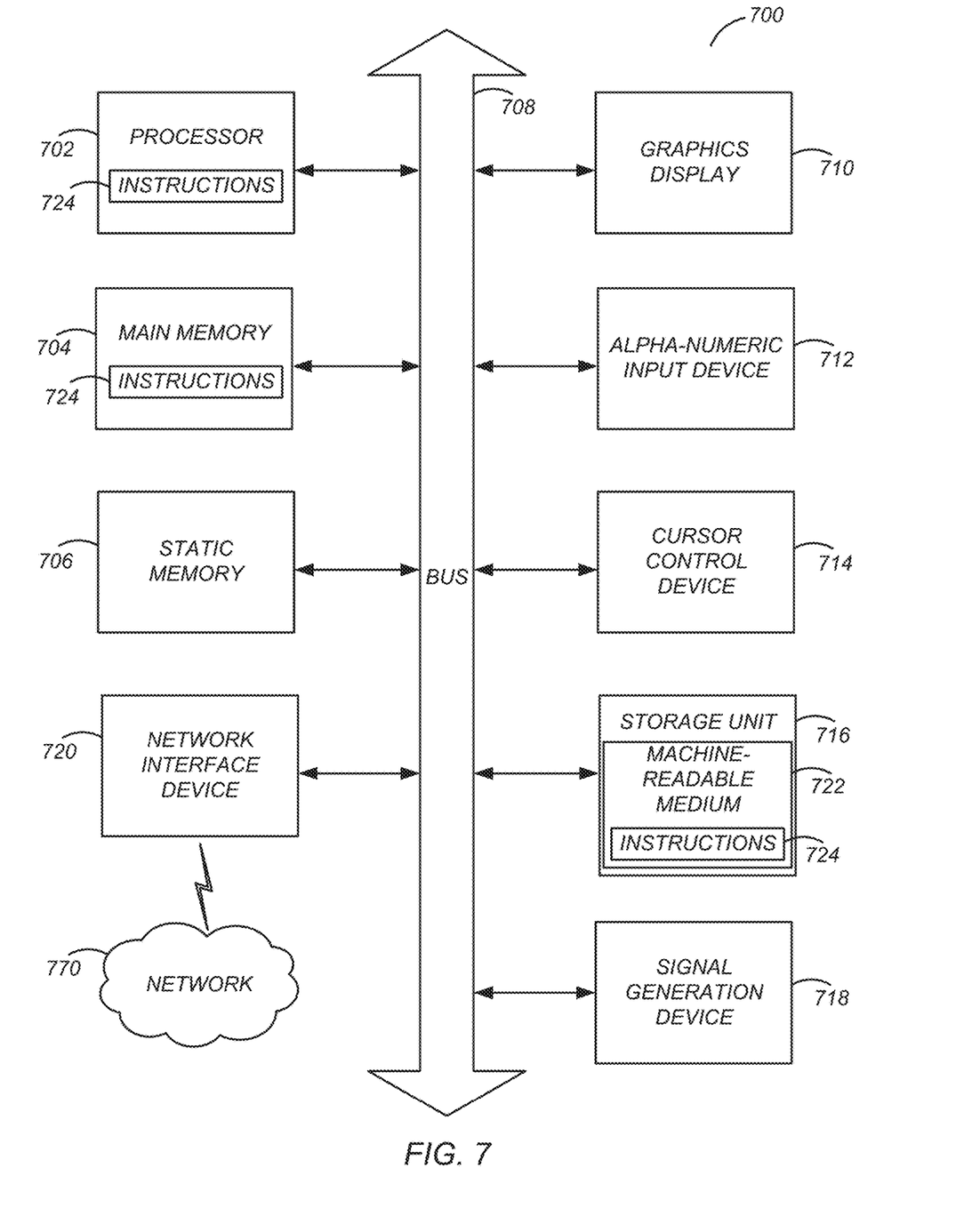
FIG. 7 is a block diagram illustrating an example of a computer suitable for use in the networked gaming system of FIG. 1, according to one embodiment.

FIG. 7 is a high-level block diagram illustrating components of an example machine able to reach instructions from a machine-readable medium and execute them in a processor (or controller).

More specifically, FIG. 7 shows a diagrammatic representation of a machine in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

It is noted that the computing devices described herein, for example, client devices 110, game system 130, may include some or all of the components illustrated and described herein with respect to FIG. 7 depending on its particular implementation. Moreover, additional components may be included to work in conjunction with some or all of the components illustrated and described with FIG. 7.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704 and the storage unit 716 communicate via a bus 708.

In addition, the computer system 706 can include a static memory 706, a display driver 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

While the described embodiment performs rendering of AR elements on the game system 130, in other embodiments, some or all of the rendering is performed by the 3D rendering engines on the client devices 110. For example, in one embodiment, the session control module 145 determines an effect of a state update based on user input through the game application 102 and instructs the 3D rendering engine on the client device 110 to render and display one or more AR elements associated with the state update. In still other embodiments, rendering is performed both server-side and client-side.

Further, while the described embodiment facilitates gameplay in augmented reality environments, in other embodiments, the state machine may be used in conjunction with non-augmented hardware systems and can network both augmented and non-augmented hardware systems with identical or similar results. Non-augmented hardware systems do not support digital overlays on the physical world; however, by networking the traffic of virtual objects, the state machine allows users to play with others, despite their device specifications.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for managing a networked game session. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A computer-implemented method for generating a composite video associated with a networked gaming session, the method comprising:
    receiving, from a client device of a user of a game system, a request to initiate a game session;
    instructing a front-facing camera on the client device to initiate a first video feed, the first video feed overlaid by one or more augmented reality (AR) elements associated with the game session;
    receiving user input comprising an instruction to terminate the game session;
    responsive to receiving the user input, instructing the front-facing camera on the client device to terminate the first video feed;
    responsive to receiving an indication that the front-facing camera on the client device has terminated the first video feed, automatically instructing a rear-facing camera on the client device to capture a second video feed;
    stitching the second video feed and an edited version of the first video feed to generate a composite video associated with the game session, wherein the second video feed is displayed after the edited first video feed in the composite video; and providing the composite video for display on the client device.

2. The computer-implemented method of claim 1, further comprising:
    receiving user input comprising an instruction to share the composite video; and
    providing, responsive to receiving the user input, the composite video for display to other users of the game system.

3. The computer-implemented method of claim 1, further comprising generating the edited version of the first video feed by:
    searching the first video feed for one or more markers associated with the game session;
    selecting, responsive to identifying a plurality of markers associated with the game session in the first video feed, one or more markers having a cumulative duration of less than or equal to a threshold time; and
    filtering the first video feed to include video footage associated with the selected markers.

4. The computer-implemented method of claim 1, wherein the rear-facing camera captures the second video feed for a specified period of time after the front-facing camera terminates the first video feed.

5. The computer-implemented method of claim 1, further comprising generating one or more AR elements associated with the composite video.

6. The computer-implemented method of claim 3, further comprising randomly selecting the one or more markers for inclusion in the composite video.

7. The computer-implemented method of claim 1, further comprising increasing a speed of the second video feed.

8. The computer-implemented method of claim 1, further comprising generating one or more AR elements based on an outcome of the game session.

9. The computer-implemented method of claim 1, further comprising generating the edited version of the first video feed by:
   selecting, from the first video feed, a specified number of game events; and
   filtering the first video feed to include video footage associated with the selected game events.

10. The computer-implemented method of claim 9, wherein selecting the specified number of game events is based on specified parameters and wherein the game events are weighted based on elements of visual interest.

11. A non-transitory computer-readable storage medium comprising stored instructions thereon that when executed by a processor cause the processor to:
   receive, from a client device of a user of a game system, a request to initiate a game session;
   instruct a front-facing camera on the client device to initiate a first video feed, the first video feed overlaid by one or more augmented reality (AR) elements associated with the game session;
   receive user input comprising an instruction to terminate the game session;
   responsive to receiving the user input, instruct the front-facing camera on the client device to terminate the first video feed;
   responsive to receiving an indication that the front-facing camera on the client device has terminated the first video feed, automatically instruct a rear-facing camera on the client device to capture a second video feed;
   stitch the second video feed and an edited version of the first video feed to generate a composite video associated with the game session, wherein the second video feed is displayed after the edited first video feed in the composite video; and
   provide the composite video for display on the client device.

12. The non-transitory computer-readable storage medium of claim 11, wherein the instructions further cause the processor to:
   receive user input comprising an instruction to share the composite video; and
   provide, responsive to receiving the user input, the composite video for display to other users of the game system.

13. The non-transitory computer-readable storage medium of claim 11, wherein the instructions further cause the processor to generate the edited version of the first video feed by:
   searching the first video feed for one or more markers associated with the game session;
   selecting, responsive to identifying a plurality of markers associated with the game session in the first video feed, one or more markers having a cumulative duration of less than or equal to a threshold time; and
   filtering the first video feed to include video footage associated with the selected markers.

14. The non-transitory computer-readable storage medium of claim 11, wherein the rear-facing camera captures the second video feed for a specified period of time after the front-facing camera terminates the first video feed.

15. The non-transitory computer-readable storage medium of claim 11, wherein the instructions further cause the processor to generate one or more AR elements associated with the composite video.

16. The non-transitory computer-readable storage medium of claim 13, wherein the instructions further cause the processor to randomly select the one or more markers for inclusion in the composite video.

17. The non-transitory computer-readable storage medium of claim 11, wherein the instructions further cause the processor to increase a speed of the second video feed.

18. The non-transitory computer-readable storage medium of claim 11, wherein the instructions further cause the processor to generate one or more AR elements based on an outcome of the game session.

19. The non-transitory computer-readable storage medium of claim 11, wherein the instructions further cause the processor to generate the edited version of the first video feed by:
   selecting, from the first video feed, a specified number of game events; and
   filtering the first video feed to include video footage associated with the selected game events.

20. The computer-implemented method of claim 19, wherein selecting the specified number of game events is based on specified parameters and wherein the game events are weighted based on elements of visual interest.

* * * * *

UNITED STATES PATENT AND TRADEMARK OFFICE
CERTIFICATE OF CORRECTION

PATENT NO.         : 10,905,957 B2
APPLICATION NO.    : 16/396485
DATED              : February 2, 2021
INVENTOR(S)        : Shriram et al.

Page 1 of 1

It is certified that error appears in the above-identified patent and that said Letters Patent is hereby corrected as shown below:

In the Claims

In Column 16, in Claim 3, Lines 58-59, delete "generating the edited version of the first video feed by:" and insert -- editing the first video feed, wherein the editing comprises: --, therefor.

In Column 18, in Claim 20, Line 47, delete "The computer-implemented method" and insert -- The non-transitory computer-readable storage medium --, therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*